United States Patent
Krummel et al.

(10) Patent No.: US 9,520,991 B2
(45) Date of Patent: Dec. 13, 2016

(54) APPARATUS FOR HANDLING BILLS AND/OR COINS, AND METHOD FOR INITIALIZING AND OPERATING SUCH AN APPARATUS

(71) Applicant: WINCOR NIXDORF INTERNATIONAL GMBH, Paderborn (DE)

(72) Inventors: Volker Krummel, Paderborn (DE); Michael Nolte, Brakel (DE); Bernd Redecker, Luebbecke (DE)

(73) Assignee: WINCOR NIXDORF INTERNATIONAL GMBH, Paderborn (DE)

( * ) Notice: Subject to any disclaimer, the term of this patent is extended or adjusted under 35 U.S.C. 154(b) by 95 days.

(21) Appl. No.: 14/354,820

(22) PCT Filed: Oct. 25, 2012

(86) PCT No.: PCT/EP2012/071175
§ 371 (c)(1),
(2) Date: Apr. 28, 2014

(87) PCT Pub. No.: WO2013/060789
PCT Pub. Date: May 2, 2013

(65) Prior Publication Data
US 2014/0307869 A1    Oct. 16, 2014

(30) Foreign Application Priority Data
Oct. 27, 2011   (DE) .......................... 10 2011 054 842

(51) Int. Cl.
*H04K 1/00* (2006.01)
*H04L 9/08* (2006.01)
*G06F 21/73* (2013.01)

(52) U.S. Cl.
CPC ............. *H04L 9/0822* (2013.01); *G06F 21/73* (2013.01); *G06F 2221/0704* (2013.01); *H04L 2209/24* (2013.01)

(58) Field of Classification Search
CPC ..... G06F 21/60; G06F 21/6209; H04L 9/0618
(Continued)

(56) References Cited

U.S. PATENT DOCUMENTS 6,675,067 B2 * 1/2004 Blad ............................ 700/244
6,683,954 B1 * 1/2004 Searle ..................... G06F 21/10
380/281

(Continued)

FOREIGN PATENT DOCUMENTS

EP    1 469 369    10/2004
EP    2 184 695    5/2010
(Continued)

OTHER PUBLICATIONS

International Search Report of Jan. 11, 2013.
German Search Report of Jun. 13, 2012.

*Primary Examiner* — Dede Zecher
*Assistant Examiner* — Viral Lakhia
(74) *Attorney, Agent, or Firm* — Gerald E. Hespos; Michael J. Porco; Matthew T. Hespos

(57) ABSTRACT

An apparatus (10) for handling bills and/or coins has a control unit (12) that detects a peripheral device connected to the control unit (12), generates a data encryption key (DEK), reads from the peripheral device identification information (W) that denotes the peripheral device, generates a key encryption key (KEK) based the read identification information (W), stores an encrypted data encryption key (VDEK) generated by encrypting the data encryption key (DEK) using the key encryption key (KEK) in a memory area of a hard disk (14), and ascertains the data encryption key (DEK) by decrypting the encrypted data encryption key (VDEK) using the key encryption key (KEK). The control unit (12) encrypts useful data to be stored on the hard disk (14) in encrypted form using the data encryption key (DEK) or decrypts useful data stored on the hard disk in encrypted form using the data encryption key (DEK).

9 Claims, 3 Drawing Sheets

(58) Field of Classification Search
USPC ...... 380/30, 28, 44, 279; 713/155, 171, 193; 700/244
See application file for complete search history.

(56) References Cited

U.S. PATENT DOCUMENTS

| | | | |
|---|---|---|---|
| 6,782,101 B1 * | 8/2004 | Huntress | 380/44 |
| 7,121,460 B1 | 10/2006 | Parsons et al. | |
| 7,130,426 B1 * | 10/2006 | Cha | G11B 20/00869 380/201 |
| 7,634,659 B2 * | 12/2009 | Fahrny | 713/171 |
| 7,688,975 B2 * | 3/2010 | Lin et al. | 380/44 |
| 8,239,678 B2 | 8/2012 | Cuellar et al. | |
| 8,578,467 B2 * | 11/2013 | Ronda | H04L 63/0853 713/172 |
| 8,687,814 B2 * | 4/2014 | Nord et al. | 380/286 |
| 8,775,793 B2 * | 7/2014 | Limber | 713/155 |
| 8,837,734 B2 * | 9/2014 | McCallum et al. | 713/193 |
| 8,949,624 B2 * | 2/2015 | Kocher | G11B 20/00086 713/193 |
| 8,989,388 B2 * | 3/2015 | Patnala et al. | 380/279 |
| 2004/0165725 A1 | 8/2004 | Kumar et al. | |
| 2004/0172538 A1 * | 9/2004 | Satoh | G06F 21/80 713/175 |
| 2005/0114689 A1 * | 5/2005 | Strom | G06F 21/10 713/193 |
| 2012/0042389 A1 * | 2/2012 | Bradley | G06Q 20/1235 726/26 |
| 2013/0145177 A1 * | 6/2013 | Cordella et al. | 713/193 |

FOREIGN PATENT DOCUMENTS

| | | |
|---|---|---|
| WO | 01/31839 | 5/2001 |
| WO | 2009/105002 | 8/2009 |

* cited by examiner

APPARATUS FOR HANDLING BILLS AND/OR COINS, AND METHOD FOR INITIALIZING AND OPERATING SUCH AN APPARATUS

BACKGROUND

1. Field of the Invention

The invention relates to an apparatus for handling bills and/or coins and to methods for initializing and operating the apparatus.

2. Description of the Related Art

Known apparatuses for handling bills and/or coins usually have a control unit to which a plurality of peripheral devices and also a hard disk for storing useful data from the apparatus are connected. In addition, it is known that the security-relevant useful data stored on the hard disk can be protected by encrypting the useful data to be stored on the hard disk. If such a hard disk is stolen, this is intended to prevent access to the useful data stored in encrypted form.

It is therefore an object of the invention to specify an apparatus and a method for handlings bills and/or coins that allow simple handling of a hard disk for storing encrypted data.

SUMMARY OF THE INVENTION

According to the invention, the apparatus comprises a control unit, at least one peripheral device connected to the control unit and a hard disk connected to the control unit. The control unit is set up to detect the peripheral device connected to the control unit, to generate a data encryption key, to read a piece of identification information from the peripheral device, which piece of identification information explicitly denotes the peripheral device, to generate a key encryption key on the basis of the read piece of identification information, to store an encrypted data encryption key, which can be generated by encrypting the data encryption key using the key encryption key, in a memory area of the hard disk, to ascertain the data encryption key by decrypting the encrypted data encryption key using the key encryption key, and to encrypt useful data to be stored on the hard disk in encrypted form using the data encryption key or to decrypt useful data stored on the hard disk in encrypted form using the data encryption key.

The effect achieved thereby is, inter alia, that the useful data stored on the hard disk in encrypted form cannot be read without a data encryption key. If the hard disk is removed from the apparatus by a thief and stolen, the thief does not have the data encryption key that is necessary for decryption. He is able to obtain said data encryption key only if he is able to decrypt the encrypted data encryption key, which is possible only using the key encryption key, however, since the encrypted data encryption key has been encrypted using the key encryption key. According to the invention, the key encryption key has been calculated using a mathematical algorithm and a piece of identification information read from the peripheral device, such as a serial number, a serial number information code, an MAC address, a network address, a hardware address, an Ethernet address, an airport address, a WiFi address and/or a manufacturer identification datum. Therefore, the thief is able to ascertain the key encryption key only if he knows the piece of identification information read from the peripheral device. However, there is no possibility of this if he has merely been able to steal the hard disk and has had to leave the peripheral device behind.

Accordingly, the invention is based on the insight that hard disk encryption with a key encryption key that is determined from an explicit piece of identification information read from a locally connected peripheral device cannot, in principle, be decrypted by a thief of the hard disk unless he has the pieces of identification information read from the locally connected peripheral devices. Assuming that the connected peripheral device does not fall into the hands of the thief, perfectly secure hard disk encryption is therefore possible. Decryption of the useful data stored on the hard disk is an automatic possibility by virtue of the piece of identification information being read from the peripheral device and the data encryption key being ascertained by automatically decrypting the encrypted data encryption key using the key encryption key and the piece of identification information and being used to decrypt the encrypted useful data. The data encryption key ascertained in this manner can also be used to encrypt the useful data to be stored on the hard disk in encrypted form.

Useful data may be any type of data that can be stored on the hard disk, particularly program data, log data, user data. Within the meaning of the invention, hard disks are considered to include magnetic disk memories and other nonvolatile memories, particularly also solid state hard disks, SD cards and other nonvolatile semiconductor memories.

A further advantage of the invention is that if the key encryption key has become publicly accessible without the associated encrypted data encryption key and hence also the data encryption key having become publicly accessible, the hard disk does not need to be recoded but rather it is merely necessary for a new key encryption key to be generated, for example using another algorithm for generating the key encryption key, and for the old encrypted data encryption key to be replaced on the hard disk by this new encrypted data encryption key. This has the advantage that laborious recoding of the hard disk can be avoided.

The inventive apparatus is particularly an automated teller machine, a cash system or an automatic cash safe. The cash system is particularly a cash system as used in retail that is used by a cashier or is embodied as what is known as a "self-check out system".

Preferably, the apparatus has at least two peripheral devices, wherein the control unit is set up to detect each peripheral device connected to the control unit, to read from each peripheral device a respective piece of identification information that explicitly denotes the respective peripheral device, to generate for the peripheral devices a respective on the basis of the respective read pieces of identification information, to store encrypted data encryption keys, which can be generated by encrypting the data encryption key with the respective key encryption key, on the hard disk, to ascertain the data encryption key from the encrypted data encryption keys using the respective key encryption key by means of decryption, and to permit access to encrypted useful data stored on the hard disk only when the data encryption key can be ascertained from at least one of the encrypted data encryption keys.

In this case, there is particularly a configuration with N peripheral devices, N being a natural number greater than or equal to 2. For each of the N peripheral devices, a respective key encryption key is calculated for each piece of identification information read from the respective peripheral device. The data encryption key is encrypted with each of the key encryption keys, as a result of which N encrypted data encryption keys are generated. According to the invention, the access to encrypted useful data stored on the hard disk is permitted by the control unit only when the data encryption key can be ascertained from at least one of the encrypted data encryption keys. This allows what is known as a "three out of five" scenario to be implemented, for example. In this case, the number of peripheral devices taken into account is equal to 5 and the number of encrypted data encryption keys from which the data encryption key can actually be ascertained is equal to 3. Hence, the access to encrypted useful data stored on the hard disk is permitted only when the data encryption key can be ascertained from at least three of the encrypted data encryption keys. Alternatively, however, any other "M out of N" scenarios are possible, M and N being positive integers where M<N.

This has the advantage that the peripheral devices that need to be swapped during a typical life of such an apparatus, which is usually 8 to 10 years, can be swapped without the apparatus needing to be reinitialized or reparameterized.

In a further preferred embodiment, every single one of the key encryption keys is generated on the basis of all N pieces of identification information read from the peripheral devices. This has the advantage that every single encrypted data encryption key can be decrypted only with knowledge of all N pieces of identification information read from the peripheral devices. It would therefore be necessary to steal all existent peripheral devices together with the hard disk in order to be able to decrypt the hard disk.

In a further preferred embodiment, the control unit is set up to permit the access to the encrypted useful data stored on the hard disk only when the data encryption key can be ascertained from each of the encrypted data encryption keys. This has the advantage that the access to the encrypted data is possible only when all N pieces of identification information read from the peripheral devices are available.

In a further preferred embodiment, the control unit is set up to permit the access to the encrypted useful data stored on the hard disk only when the data encryption key can be ascertained from a preset number of encrypted data encryption keys, the number being at least equal to 2 and less than the number of stored encrypted data encryption keys.

The peripheral device or the peripheral devices may be an encrypting PIN pad, a receiving and/or disbursing module for bills or other paper-based media, a coin disbursing and/or coin receiving module, a card reader for reading magnetic strip and/or chip cards, a screen, a touch screen, a video camera, a printer, an alphanumeric keypad, a device for paying in cheques, an interface module for providing an interface, an RFID read and/or write module, a barcode scanner, a headphone port, a loudspeaker, a network card, a graphics card, a memory element, a semiconductor memory element, a further hard disk and/or a banknote recognition and/or banknote authenticity checking unit. The encrypting PIN pad is a special keypad for the secure input of PINs on automated teller machines or money transfer terminals.

In a further preferred embodiment, the hard disk has at least one unencrypted memory area and at least one memory area encrypted using the data encryption key. This allows the encrypted data encryption keys to be stored in the unencrypted memory area and the useful data that are to be stored in encrypted form to be stored in the encrypted memory area.

This has the advantage that the encrypted data encryption keys are easily accessible and can be decrypted only by an authorized user who has the key encryption key(s). In addition, the advantage is that the useful data to be stored in encrypted form are stored on the hard disk separately from useful data that do not need to be stored in encrypted form, which allows simplified hard disk management.

In a further preferred embodiment, the useful data to be stored in encrypted form are stored as files encrypted using the data encryption key. This has the advantage, inter alia, that the useful data to be stored can be moved without restriction on the hard disk. This allows variable management of the hard disk without being tied to a size specification for particular areas on the hard disk.

A further aspect of the invention relates to a method for initializing an apparatus for handling bills and/or coins that comprises the following steps:

detection of a peripheral device connected to a control unit, generation of a data encryption key, reading of a piece of identification information for the peripheral device that explicitly denotes the peripheral device, generation of a key encryption key on the basis of the read piece of identification information (W), storage of an encrypted data encryption key, which is generated by encrypting the data encryption key using the key encryption key, in a memory area of a hard disk connected to the control unit, encryption of useful data to be stored on the hard disk using the data encryption key, and storage of the encrypted useful data on the hard disk.

An encrypted data encryption key generated using the method is therefore not easily decrypted by an unauthorized party if it is not possible to access the peripheral device or the piece of identification information read therefrom.

The developments described in connection with the apparatus can also be applied to the present method. In particular, it is preferred for more than two peripheral devices to be used. In this case, it is possible to generate a dedicated key encryption key for each peripheral device from which an explicit piece of identification information can be read and to use this key encryption key to encrypt the data encryption key. It is also conceivable to generate a single key encryption key from all pieces of identification information read from the peripheral devices and to use this key encryption key to encrypt the data encryption key.

As in connection with the apparatus described above, the method also allows what is known as an "M out of N" scenario to be implemented, M and N being positive integers where N>M. The "M out of N" scenario prompts reparameterization to be performed only when at least M of the N peripheral devices used for the original key generation are connected to the control unit. In this case, it is also possible to reset the "M out of N" scenario again, so that the peripheral devices connected for the reparameterization are deemed the N originally connected peripheral devices.

A further aspect of the invention relates to a method for operating an apparatus for handling bills and/or coins that comprises the following steps:

detection of a peripheral device connected to a control unit, reading of a piece of identification information for the peripheral device that explicitly denotes the peripheral device, generation of a key encryption key on the basis of the read piece of identification information, reading of an encrypted data encryption key that is stored in a memory area of a hard disk connected to the control unit and that has been generated by encrypting a data encryption key, generated in an initialization step, using the key encryption key, ascertainment of the data encryption key by decrypting the read encrypted data encryption key using the key encryption key, and reading of useful data stored on the hard disk in encrypted form, decryption of the read useful data using the data encryption key.

This method of operation does not allow an encrypted data encryption key generated using the initialization method to be decrypted when it is not possible to access the peripheral device or the piece of identification information read from the peripheral device.

The present method describes the mode of operation of an apparatus described above, the method preferably being started and executed whenever the apparatus is restarted.

A preferred embodiment of the method also has the following steps:

encryption of useful data to be stored on the hard disk in encrypted form using the data encryption key, and writing of the encrypted useful data to the hard disk.

During the operation of an inventive apparatus, newly input data need to be written to the hard disk in encrypted form in the same way as the encrypted useful data that are already existent on the hard disk. This is a simple matter with the present development.

A further preferred embodiment of the method has the following steps:

detection of a plurality of peripheral devices connected to the control unit, reading of a respective piece of identification information from the peripheral devices that explicitly denotes the respective peripheral device, generation of a respective key encryption key on the basis of the respectively read pieces of identification information, reading of encrypted data encryption keys stored in a memory area of the hard disk that have been generated by encrypting the data encryption key with the respective key encryption key, ascertainment of the data encryption key by decrypting the encrypted data encryption keys using the respective key encryption key, and permission of access to the encrypted hard disk only when the data encryption key can be ascertained from at least one of the encrypted data encryption keys.

This embodiment substantiates the method for a plurality of peripheral devices connected to the control unit by using an "M out of N" scenario.

The developments described in connection with the apparatus can also be applied to the present method.

Instead of generating the N encrypted data encryption keys using the N key encryption keys, it is also possible to generate a single key encryption key from the N pieces of identification information read from the peripheral devices and to store only an encrypted data encryption key, which is generated by encrypting the data encryption key using the key encryption key, on the hard disk. This has the advantage that the encrypted data encryption key can be decrypted only with access to the read piece of identification information used for encryption. This may involve the stipulation that the data encryption key need to be able to be decrypted only once in order to decrypt the useful data.

Preferably, the access to the encrypted useful data stored on the hard disk is permitted only when the data encryption key can be ascertained from each of the encrypted data encryption keys. This the advantage that the thief gains access to the encrypted data only if he has all N pieces of identification information that have been read from the peripheral devices and that have been used for the encryption.

According to a further preferred embodiment, the access to the encrypted useful data stored on the hard disk is permitted only when the data encryption key can be ascertained from a certain minimum number of encrypted data encryption keys, the minimum number being at least equal to 2 and less than the number of peripheral devices.

As in connection with the apparatus described above, what is known as an "M out of N" scenario is implemented in this case too. In this context, M and N are positive integers where N>M. In this case, the "M out of N" scenario prompts access to the encrypted useful data stored on the hard disk to be permitted only when at least M of the N peripheral devices originally used for key generation are connected to the control unit.

In the case of the specified invention and its preferred embodiments, only some of the actually existent peripheral devices of the apparatus can be used to generate a respective key encryption key and to encrypt and decrypt the data encryption key in each case using the key encryption keys.

Further features and advantages of the invention become apparent from the description below, which provides a more detailed explanation of the invention using exemplary embodiments in connection with the appended figures.

DETAILED DESCRIPTION OF THE PREFERRED EMBODIMENTS

Figure 1:
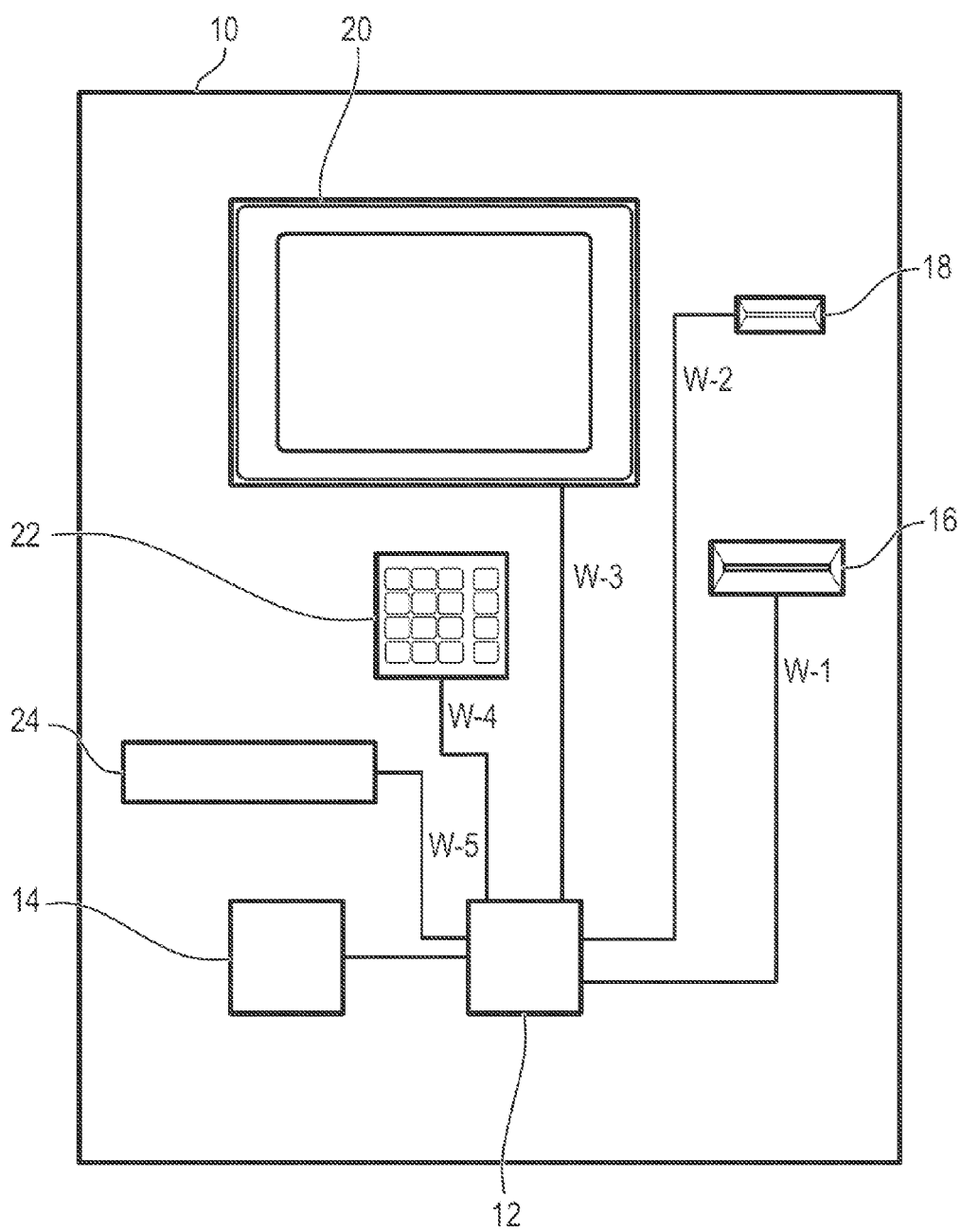
FIG. 1 shows a schematic illustration of an apparatus for handling bills and/or coins.

FIG. 1 shows an apparatus 10 for handling bills and/or coins. The apparatus 10 is particularly an automated teller machine that allows bills to be paid in and also paid-in bills to be disbursed again. The apparatus 10 has a control unit 12 to which both a hard disk 14 and a plurality of further peripheral devices are connected.

For the purpose of paying in and/or disbursing bills, the apparatus 10 contains a receiving and disbursing module 16 that is connected to the control unit 12. The receiving and disbursing module 16 has a piece of identification information W_1 that can be read by the control unit 12.

For the purpose of reading magnetic strip and/or chip cards, the apparatus 10 has a card reader 18 that is in turn connected to the control unit 12. The card reader 18 has a piece of identification information W_2 that can be read by the control unit 12.

For the purpose of displaying messages and for the purpose of function selection, the control unit 12 is connected to a touch-sensitive screen 20, what is known as a touch screen. The screen 20 has a piece of identification information W_3 that can likewise be read by the control unit 12.

For the purpose of inputting personal identification numbers (PINs) or secret numbers or other numerical values, an encrypting PIN pad 22 is furthermore installed that is likewise connected to the control unit 12. The encrypting PIN pad 22 has a piece of identification information W_4 that can likewise be read by the control unit 12.

In addition, the apparatus 10 has a printer 24, connected to the control unit 12, for printing account statements or other user-specific data. The printer 24 has a piece of identification information W_5 that can likewise be read by the control unit 12.

Figure 2:
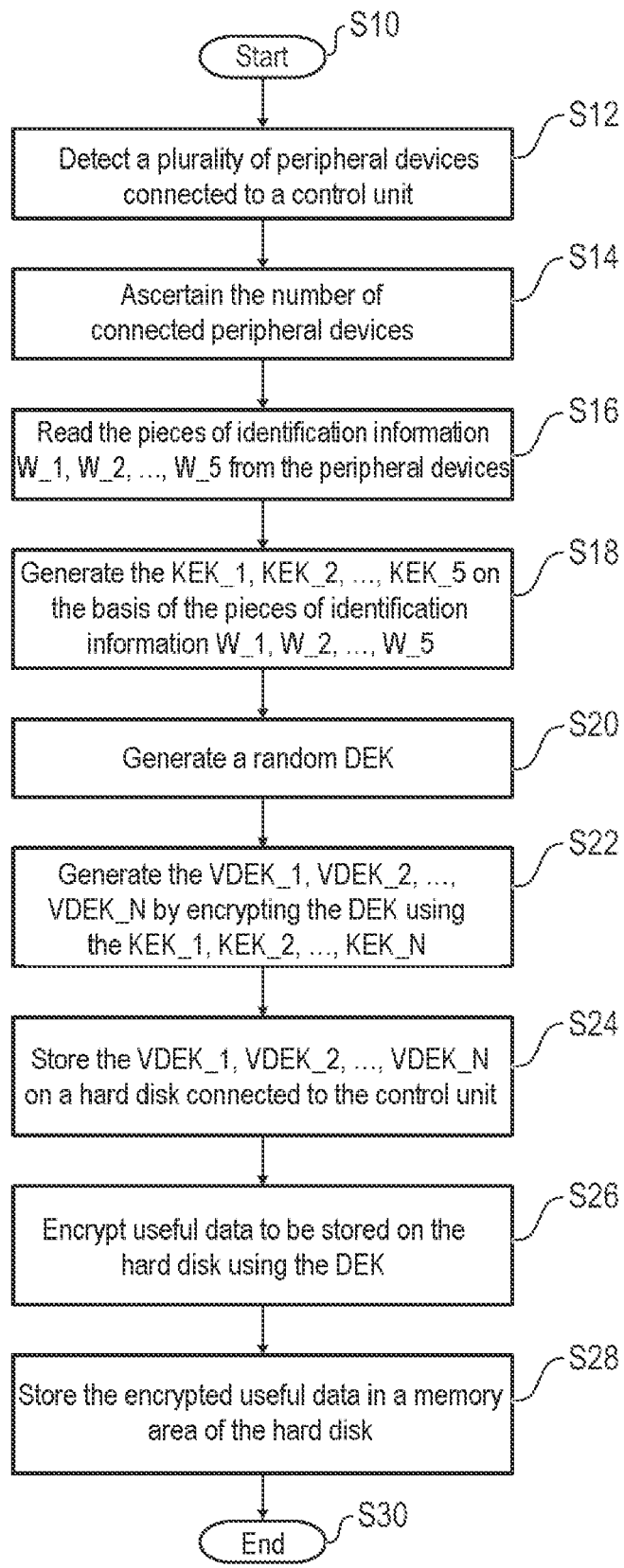
FIG. 2 shows a flowchart for a method for initializing an apparatus for handling bills and/or coins.
Figure 3:
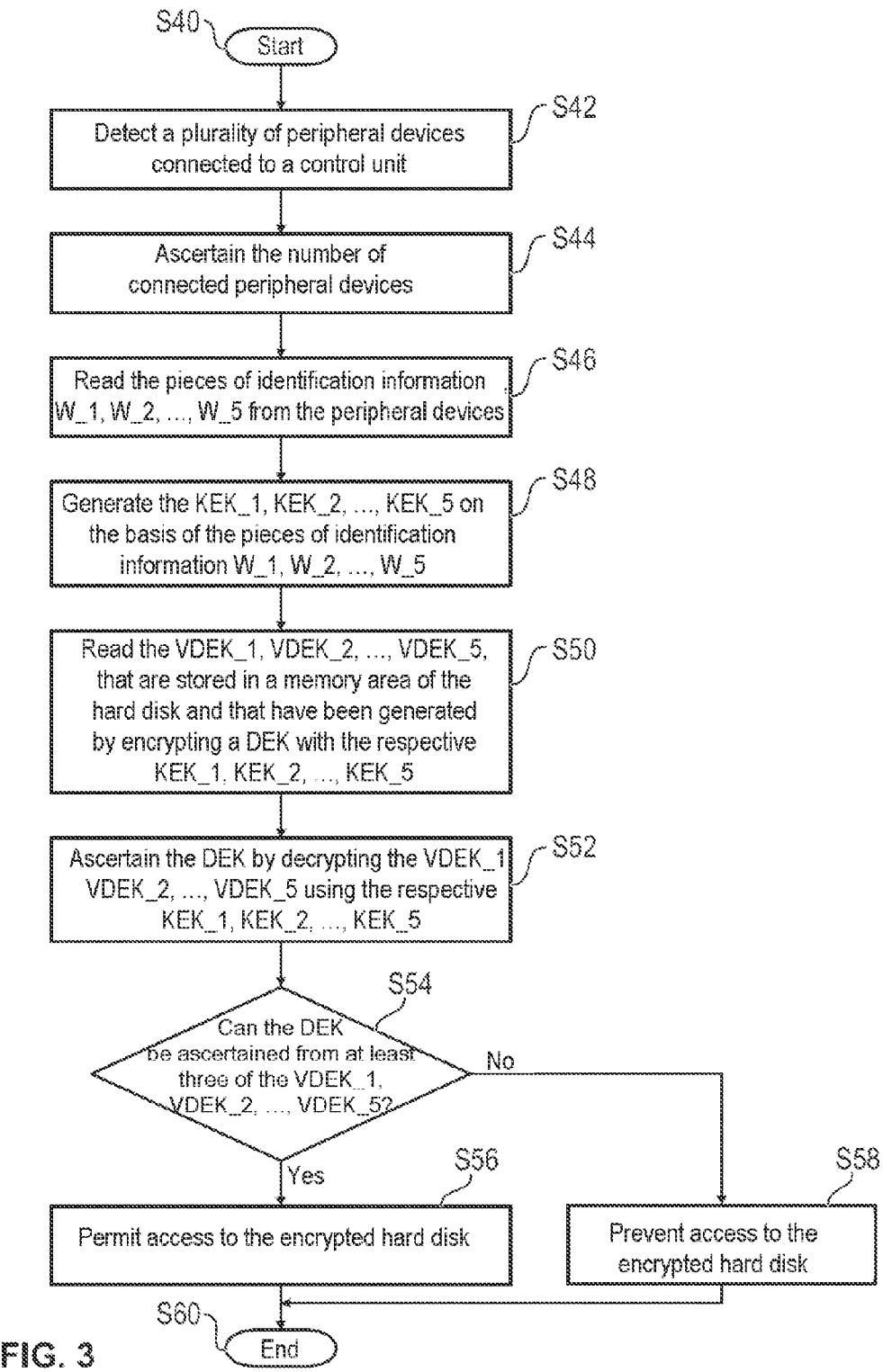
FIG. 3 shows a flowchart for a method for operating an apparatus for handling bills and/or coins.

FIGS. 2 and 3 below describe methods for initializing and operating the apparatus 10, particularly methods for automatic secure encryption of the hard disk 14.

FIG. 2 shows a flowchart for a method for initialization or reparameterization for the apparatus 10. When the method has been started in step S10, step S12 first of all involves all detectable peripheral devices 16, 18, 20, 22, 24 connected to the control unit 10 being ascertained.

In the next step S14, the number of peripheral devices 16, 18, 20, 22, 24 connected to the control unit 10 for which an explicit piece of identification information W, such as the serial number of the peripheral device 16, 18, 20, 22, 24, can be read from a memory of the respective peripheral device 16, 18, 20, 22, 24 is ascertained. In the present case, the number of peripheral devices 16, 18, 20, 22, 24 ascertained in this manner is 5. In other embodiments, this number may be any positive integer.

Next, step S16 involves a respective piece of identification information W_1, W_2, . . . , W_5 being read from these peripheral devices 16, 18, 20, 22, 24, each piece of identification information W_1, W_2, . . . , W_5 explicitly denoting the respective peripheral device 16, 18, 20, 22, 24.

On the basis of the five read pieces of identification information W_1, W_2, . . . , W_5, five key encryption keys KEK_1, KEK_2, . . . , KEK_5 are generated in step S18.

In a subsequent step S20, a random data encryption key DEK is generated. The data encryption key DEK is used for the subsequent described encryptions of the useful data to be stored on the hard disk 14. Therefore, the data encryption key DEK must not be known to a third party under any circumstances. In other embodiments, step S20 can take place at any point between the beginning S10 and step S18.

In step S22, five encrypted data encryption keys VDEK_1, VDEK_2, . . . , VDEK_5 are generated by encrypting the data encryption key DEK using the five key encryption keys KEK_1, KEK_2, . . . , KEK_N. In this case, it is important that after step S22 the unencrypted data encryption key DEK may be existent neither in the control unit 12 nor on the hard disk 14 nor at another point in the apparatus 10, since otherwise it could be accessible to a third party and said third party could use the data encryption key DEK to decrypt the useful data that are present on the hard disk 14 in encrypted form.

In the next step S24, the five generated encrypted data encryption keys VDEK_1, VDEK_2, . . . , VDEK_5 are stored on the hard disk 14 connected to the control unit 10. This storage of the encrypted data encryption keys VDEK_1, VDEK_2, . . . , VDEK_5 takes place in unencrypted form. The stored, encrypted data encryption keys VDEK_1, VDEK_2, . . . , VDEK_5 are therefore the most important data stored on the hard disk 14 for the operator of the apparatus 10, since only these allow the key encryption keys KEK_1, KEK_2, . . . , KEK_N and the pieces of identification information W_1, W_2, . . . , W_5 that are read from the peripheral devices 16, 18, 20, 22, 24 to be used to reconstruct the data encryption key DEK that is necessary for decrypting the hard disk 14 by decrypting one of the encrypted data encryption keys VDEK_1, VDEK_2, . . . , VDEK_5.

In the next step S26, the useful data to be stored on the hard disk 14 are encrypted using the data encryption key DEK and then in step S28 the encrypted useful data are stored in a memory area of the hard disk 14. The method is then terminated in step S30.

FIG. 3 shows a flowchart for a method for operating the apparatus 10. When the method has been started in step S40, step S42 first of all involves all detectable peripheral devices 16, 18, 20, 22, 24 connected to the control unit 10 being detected.

In the next step S44, the number of peripheral devices 16, 18, 20, 22, 24 connected to the control unit 10 for which a respective explicit piece of identification information can be read from a memory of the respective peripheral device 16, 18, 20, 22, 24 is ascertained. In the present case, the number of peripheral devices 16, 18, 20, 22, 24 ascertained in this manner is five. In other embodiments, these components may be any positive integer.

Next, step S46 involves five pieces of identification information W_1, W_2, . . . , W_5 being read from the respective peripheral device 16, 18, 20, 22, 24, each piece of identification information explicitly denoting the respective peripheral device 16, 18, 20, 22, 24.

On the basis of the five read pieces of identification information W_1, W_2, . . . , W_5, five key encryption keys KEK_1, KEK_2, . . . , KEK_5 are generated in step S48.

As a departure from the method described above, the next step S50 involves the five encrypted data encryption keys VDEK_1, VDEK_2, . . . , VDEK_5, stored in a memory area of the hard disk 14, which have been generated by encrypting a data encryption key DEK, generated in an initialization step for the apparatus 10, using the five key encryption keys KEK_1, KEK_2, . . . , KEK_5 and have been written to the hard disk, being read. In other embodiments, step S50 can be provided at any point between the beginning S40 and step S48.

Next, step S52 involves the data encryption key DEK being ascertained by decrypting the encrypted data encryption keys VDEK_1, VDEK_2, . . . , VDEK_5 using the respective key encryption key KEK_1, KEK_2, . . . , KEK_5.

In the next step S54, a test is performed to determine whether the data encryption key DEK can be ascertained from at least three of the encrypted data encryption keys VDEK_1, VDEK_2, . . . , VDEK_5.

In this case, a single test can be performed as follows: the read piece of identification information W_1 is used to calculate the key encryption key KEK_1 by means of the algorithm that is present in unencrypted form. The encrypted data encryption key VDEK_1 is then decrypted using the key encryption key KEK_1. If the piece of identification information obtained in this manner can be used to decrypt encrypted useful data stored on the hard disk 14, the read piece of identification information W_1 matches the original piece of identification information W_1 used for calculating the key encryption key KEK_1. In this case, the data encryption key DEK can be ascertained from the encrypted data encryption key VDEK_1. If such a match can be ascertained for at least three of the five encrypted data encryption keys VDEK_1, VDEK_2, . . . , VDEK_5, the control unit 12 permits the access to the useful data stored on a hard disk 14 in encrypted form.

If it has been established in step S54 that the data encryption key DEK can be ascertained from at least three of the encrypted data encryption keys VDEK_1, VDEK_2, . . . , VDEK_5, the method continues with step S56 and permits the access to the useful data stored on the hard disk 14 in encrypted form.

If it has not been established in step S54 that the data encryption key DEK can be ascertained from at least three of the encrypted data encryption keys VDEK_1, VDEK_2, ..., VDEK_5, the method continues with step S58 and does not permit the access to the useful data stored on the hard disk 14 in encrypted form.

The invention claimed is:

1. An apparatus for handling bills and/or coins, comprising:
   a control unit;
   a plurality of peripheral devices connected to the control unit;
   a hard disk connected to the control unit; and
   a data encryption key configured for encrypting useful data to be stored on the hard disk;
   wherein the control unit is configured to:
   detect the peripheral devices,
       read from each of the peripheral devices a respective piece of identification information that explicitly denotes the respective peripheral device,
       generate for the peripheral devices a respective key encryption key on the basis of the read pieces of identification information,
       store encrypted data encryption keys that can be generated by encrypting the data encryption key using the respective key encryption key, in a memory area of the hard disk,
       ascertain the data encryption key by decrypting the encrypted data encryption keys using the respective key encryption key, and
       encrypt useful data to be stored on the hard disk in encrypted form using the data encryption key or decrypt useful data that are stored on the hard disk in encrypted form using the data encryption key
       permit access to the encrypted useful data that are stored on the hard disk only when the data encryption key can be ascertained from a preset minimum number of encrypted data encryption keys, the minimum number being at least equal to 2 and less than the number of stored encrypted data encryption keys.

2. The apparatus of claim 1, wherein the control unit further is configured to generate the data encryption key.

3. The apparatus of claim 1, wherein at least one of the peripheral devices is an encrypting PIN pad, a receiving and/or disbursing module for bills or other paper-based media, a coin disbursing and/or coin receiving module, a card reader for reading magnetic strip and/or chip cards, a screen, a touch screen, a video camera, a printer, an alphanumeric keypad, a device for paying in checks, an interface module for providing an interface, an RFID read and/or write module, a barcode scanner, a headphone port, a loudspeaker, a network card, a graphics card, a memory element, a semiconductor memory element, a further hard disk or a banknote recognition and/or banknote authenticity checking unit.

4. The apparatus of claim 1, wherein the piece of identification information (W) that is read from the peripheral device is at least one of a serial number, a serial number information code, an MAC address, a network address, a hardware address, an Ethernet address, an airport address, a WiFi address or a manufacturer identification datum.

5. The apparatus of claim 1, wherein:
   the hard disk has at least one unencrypted memory area and at least one memory area encrypted using the data encryption key,
   the encrypted data encryption key is stored in the unencrypted memory area, and
   the useful data to be stored in encrypted form are stored in the encrypted memory area.

6. The apparatus of claim 1, wherein the useful data to be stored in encrypted form are stored as files encrypted using the data encryption key.

7. A method for operating an apparatus for handling bills and/or coins, comprising:
   detecting a plurality of peripheral devices connected to a control unit;
   reading a respective piece of identification information from each of the peripheral devices that explicitly denotes the respective peripheral device;
   generating a respective key encryption key on the basis of the read piece of identification information;
   reading encrypted data encryption keys that are stored in a memory area of a hard disk connected to the control unit and that have been generated by encrypting the data encryption key with the respective key encryption key;
   ascertaining the data encryption key by decrypting the encrypted data encryption keys using the respective key encryption key;
   reading useful data stored on the hard disk in encrypted form;
   decrypting the read useful data using the data encryption key
   permitting access to the encrypted useful data stored on the hard disk only when the data encryption key can be ascertained from at least one of the encrypted data encryption keys; and
   permitting the access to the encrypted useful data stored on the hard disk only when the data encryption key can be ascertained from a certain minimum number of encrypted data encryption keys, the minimum number being at least equal to 1, and less than the number of peripheral devices.

8. The method of claim 7, further comprising:
   using the data encryption key for encrypting useful data to be stored on the hard disk in encrypted form; and
   writing the encrypted useful data to the hard disk.

9. The method of claim 7, further comprising permitting the access to the encrypted useful data stored on the hard disk only when the data encryption key can be ascertained from each of the encrypted data encryption keys.

* * * * *